United States Patent [19]

Stolkin et al.

[11] E Re. 29,442

[45] Reissued Oct. 18, 1977

[54] APPARATUS FOR PRODUCING CARTONS

[75] Inventors: Walter J. Stolkin, Chicago; William A. Riley, Woodridge, both of Ill.; Henry J. Sejda, Munster, Ind.

[73] Assignee: Stolmar Corporation, Chicago, Ill.

[21] Appl. No.: 679,650

[22] Filed: Apr. 23, 1976

Related U.S. Patent Documents

Reissue of:

[64] Patent No.: 3,884,130
Issued: May 20, 1975
Appl. No.: 454,256
Filed: Mar. 25, 1974

U.S. Applications:

[63] Continuation-in-part of Ser. No. 350,936, April 13, 1973, abandoned.

[51] Int. Cl.[2] ..... B31B 1/36
[52] U.S. Cl. ..... 93/49 R; 93/52
[58] Field of Search ..... 156/443; 93/49 R, 45, 93/48, 52, 36 R, 84 R

[56] References Cited

U.S. PATENT DOCUMENTS

| | | | |
|---|---|---|---|
| 2,151,733 | 3/1939 | Bonfield | 229/39 R |
| 2,702,154 | 2/1955 | Linson | 229/39 R |
| 2,857,827 | 10/1958 | Labombarde | 93/49 R |
| 2,883,916 | 4/1959 | Labombarde | 93/49 R |
| 2,896,517 | 7/1959 | Labombarde | 93/49 R |
| 3,229,596 | 1/1966 | Hottendorf | 93/49 R |
| 3,439,589 | 4/1969 | Geisler et al. | 93/52 |

FOREIGN PATENT DOCUMENTS

| | | | |
|---|---|---|---|
| 617,473 | 4/1961 | Canada | 93/49 R |
| 560,237 | 7/1958 | Canada | 93/49 R |

*Primary Examiner*—James F. Coan
*Attorney, Agent, or Firm*—McDougall, Hersh & Scott

[57] ABSTRACT

An apparatus for producing a carton whereby the carton is initially obtained in the folded condition for storage and handling and whereby the carton can then be unfolded for use. The apparatus is designed for handling different types of blanks which, generally speaking, include a plurality of panels comprising side, top and bottom panels of the carton. The bottom panels are provided with flaps, and a first folding structure is provided for folding the bottom panels over onto adjacent side panels. Simultaneously, second folding means serve to fold flaps over onto the associated bottom panels, and adhesive applying means serve to locate adhesive on the blanks in selected positions. A third folding means folds the outside ends of the blank over onto the inside portions of the blank at which time folded flaps become adhesively secured. Additional adhesive or other handling means secure the outside ends of the assembly together whereby a flat condition of the carton is obtained. The carton can then be unfolded when ready for use and will automatically assume a position for loading.

26 Claims, 25 Drawing Figures

APPARATUS FOR PRODUCING CARTONS

Matter enclosed in heavy brackets [ ] appears in the original patent but forms no part of this reissue specification; matter printed in italics indicates the additions made by reissue.

This application is a continuation-in-part of copending application Ser. No. 350,936, filed Apr. 13, 1973 entitled "Apparatus for Producing Cartons" and now abandoned.

This invention is directed to an apparatus designed for producing cartons. The invention is particularly applicable to the production of various cartons, e.g. cartons known in the trade as regular slotted containers, center special slotted containers, overlap slotted containers, center special overlap slotted containers, full flap slotted containers, center special full flap slotted containers, and regular half slotted containers.

Particular carton constructions are available which include means for automatically setting up the carton when it is unfolded, such constructions including a combination of interconnected bottom panels. In use, the cartons are adapted to be unfolded with the various panels then automatically assuming the proper configuration for use. The carton designs are extremely sturdy in addition to being extremely easy to handle. An example of such a construction is provided in applicants' copending application Ser. No. 299,375. This application is particularly directed to cartons, corrugated or solid fibre containers, and references to "cartons" herein are intended to refer to such containers.

In the manufacture of cartons of the type referred to, it is extremely important to provide efficient mechanisms for producing the cartons. Thus, the cartons are ordinarily produced in very great numbers so that the use of high speed automated production apparatus becomes a necessity. Furthermore, the marketing of the cartons comprises a highly competitive business so that it is necessary to minimize to the greatest extent possible the expense of purchasing and operating the manufacturing equipment.

It is a general object of this invention to provide an improved apparatus for use in the production of carton constructions.

It is a further object of this invention to provide an apparatus which is particularly suitable for the production of cartons which will automatically set up, such as cartons of the type described in the aforementioned application.

It is a still further object of this invention to provide an apparatus of the type described which can be produced at relatively low cost, which can be readily incorporated in existing equipment, thereby minimizing installation costs, and which can be operated at relatively low cost.

These and other objects of this invention will appear hereinafter, and for purposes of illustration, but not of limitation, specific embodiments of the invention are shown in the accompanying drawings in which.

Figure 6A:
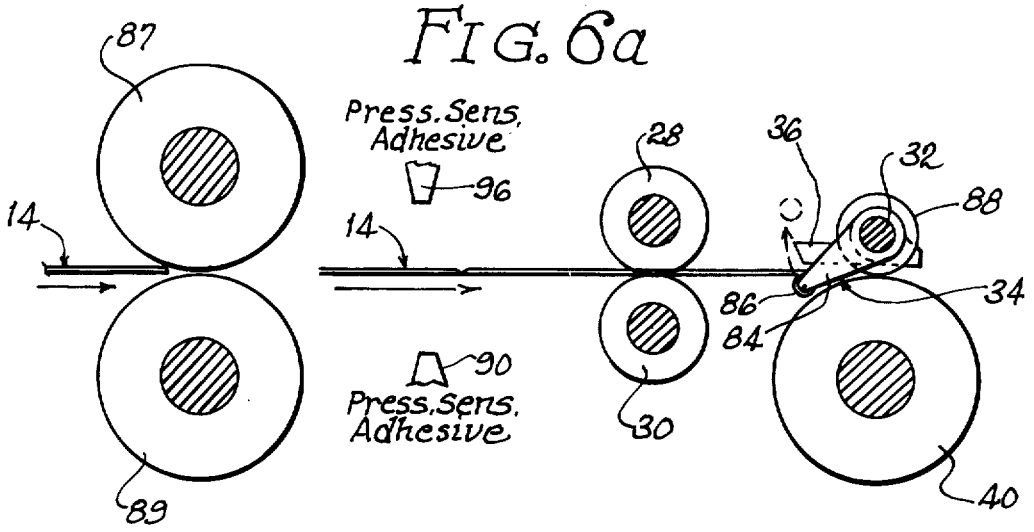
Figure 6B:
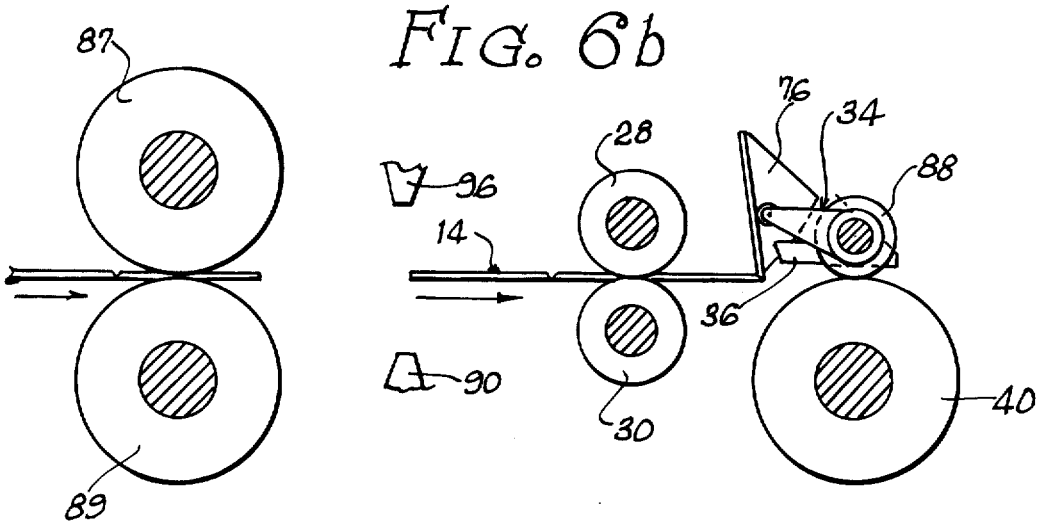
Figure 6C:
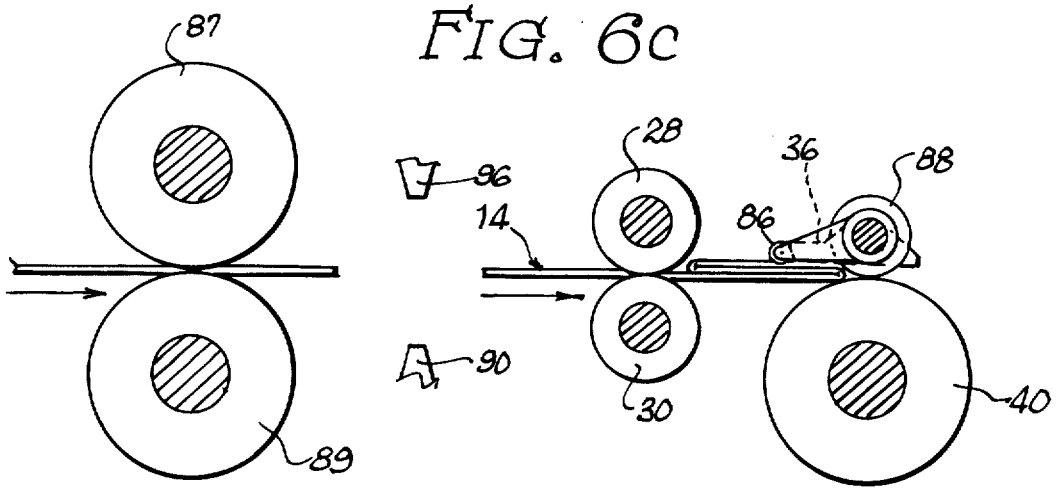
Figure 7:
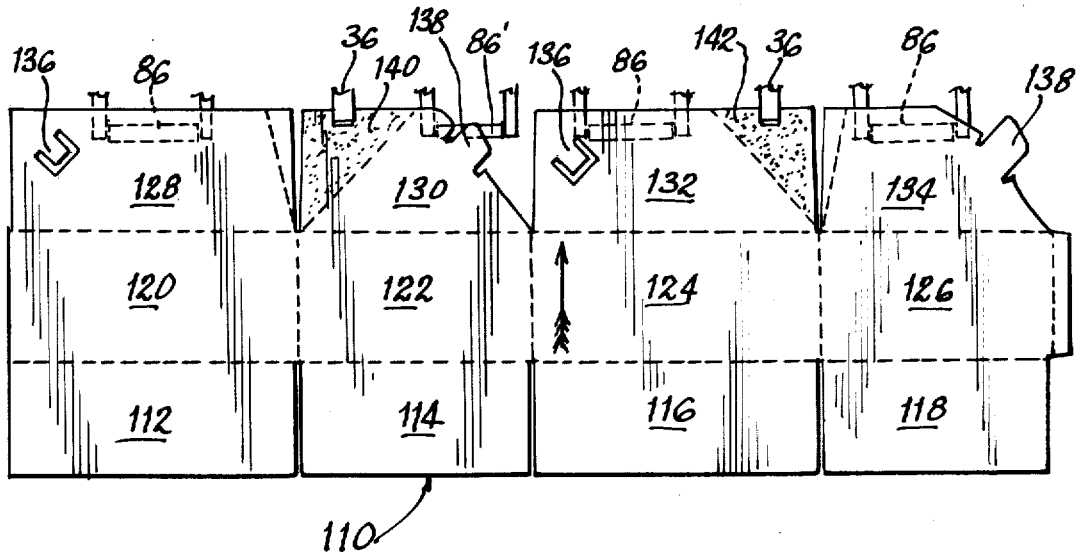

FIGS. 3a through 3g comprise schematic plan views illustrating the stages of operation of the apparatus of the invention;

FIGS. 4a through 4g comprise end views of the arrangements shown in FIGS. 3a through 3g;

FIGS. 5a through 5d illustrate particular stages of the carton folding operation as illustrated in the preceding figures;

FIGS. 6a through 6c comprise schematic cross-sectional views illustrating the operating sequence of folding [mechanisons] *mechanisms* of the invention; and, FIG. 7 is a plan view illustrating an alternative carton construction and the manner of arranging the apparatus for folding of the construction.

This invention is generally directed to an apparatus for producing a folded carton whereby the carton can be efficiently stored, shipped, and otherwise handled and whereby the carton can be readily unfolded for use. The invention is particularly directed to cartons of the general type described in the aforementioned copending applications wherein the carton is ready for use after only a simple unfolding operation.

The invention is particularly concerned with a folding structure and associated elements designed to handle the particular blank necessary for providing the carton arrangement described. The folding structure includes a first folding means which serves to fold the carton bottom panels over onto the adjacent carton side panels. A second folding device is provided for engaging flaps and these flaps are thereby folded over onto the bottom panel carrying the flaps. Adhesive is selectively applied to the blank, and third folding means then fold the ends of the blank over intermediate portions of the blank. The flaps which have been previously folded over are secured by means of the adhesive to adjacent bottom panels. Additional means, such as adhesive, serve to secure the ends of the blank together when these ends are brought into adjoining relationship by the third folding means.

The structure resulting from these operations, when unfolded, will automatically assume a carton configuration ready for loading. In this connection, the blank and folding structures will automatically provide an additional flap element which serves as a re-enforcing means for holding the carton in the unfolded condition.

Figures 1, 1A:
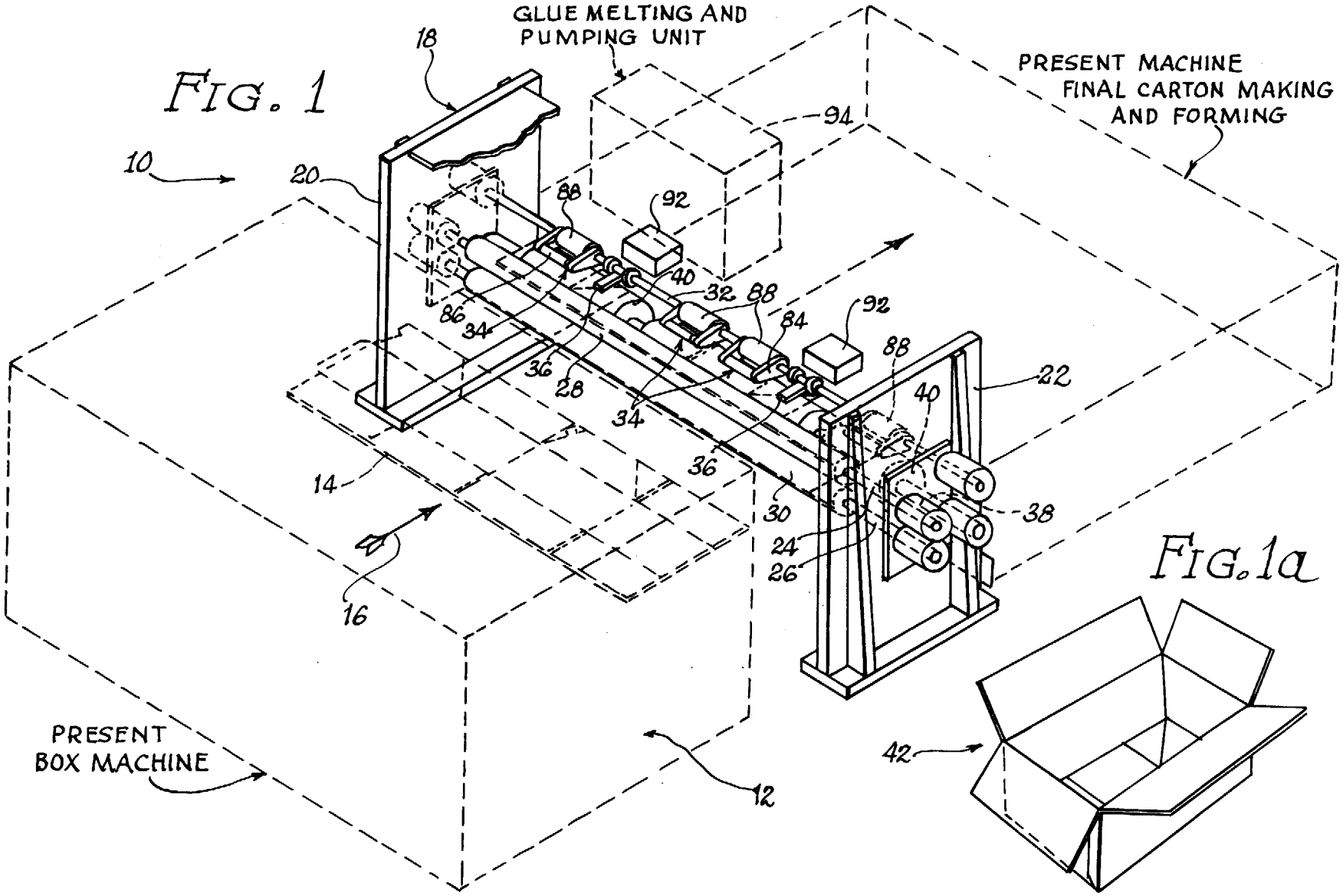
FIG. 1 is a schematic perspective view of an apparatus of the type contemplated by this invention.
FIG. 1a is a perspective view of a carton of the type adapted to be produced with the concepts of the invention.
Figure 2:
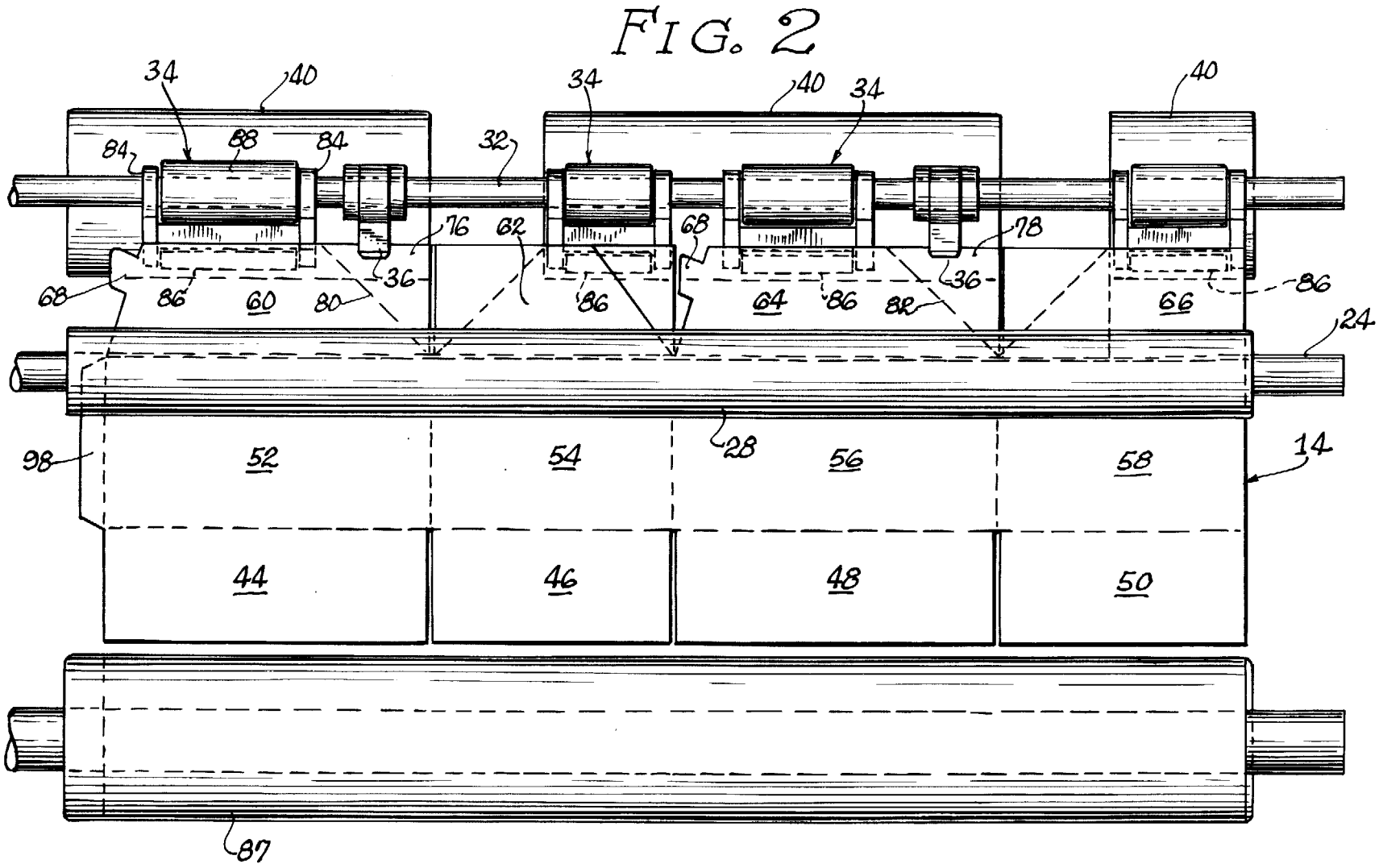
FIG. 2 is an enlarged plan view particularly illustrating the folding means utilized in the apparatus of FIG. 1.

FIG. 1 of the drawings illustrates an apparatus 10 which incorporates features of the invention. This apparatus may include basically standard operating elements in the forward section 12, such elements to include standard scoring and cutting means. Thus, it is well within the skill of the art to provide mechanisms which will provide a flat blank 14 of corrugated material or the like. Any suitable conveyor mechanism may be utilized for moving this blank and successive blanks over a supporting bed in the direction of the arrow 16. The blanks will generally be transported from a rotary die cutting section of the system.

Of particular concern in the practice of the invention is the folding apparatus 18 illustrated in FIG. 1. This apparatus comprises a pair of upstanding support plates 20 and 22. At least two shafts 24 and 26 are rotatably supported by these plates, and these shafts carry conveying rolls 28 and 30 which are adapted to engage a blank 14. A third shaft 32 is supported by the support plates, and this shaft carries folding members comprising flippers 34 and ploughs 36. A fourth shaft 38 supports rolls 40, these rolls being positioned beneath the blank at the position of the shaft 32 for supporting the blank during this phase of the operation.

Figures 3A, 3B, 3C, 3D, 3E, 3F, 3G, 4A, 4B, 4C, 4D, 4E, 4F, 4G, 5A, 5B, 5C, 5D:
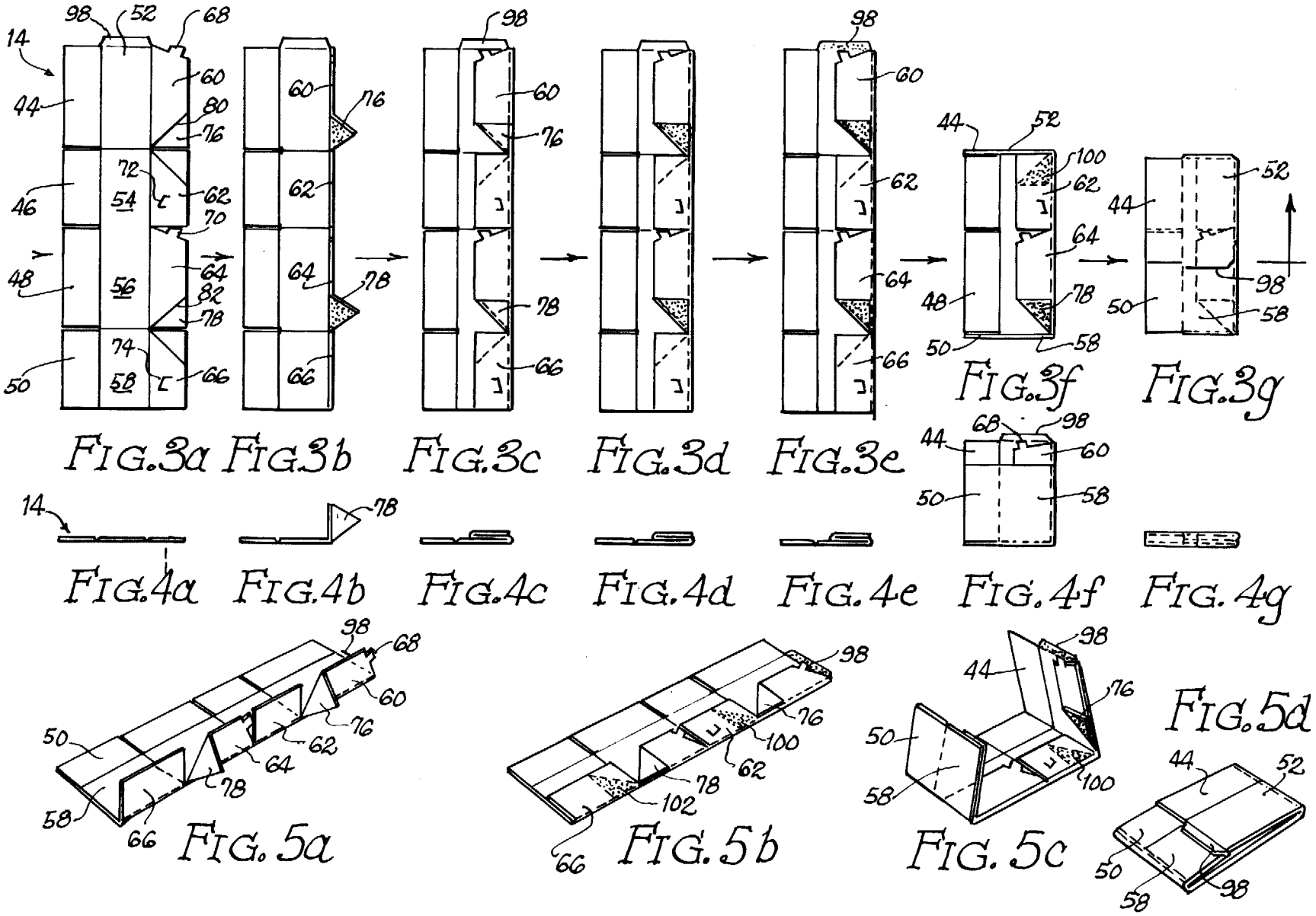

The blank is adapted to be developed into a carton such as shown at 42 in FIG. 1a. Reference is made to the aforementioned copending application for a complete description of the particular carton construction shown in FIGS. 1 through 5 although, as will become more apparent, the construction is only one example of a carton which can be formed with the apparatus of the invention. FIGS. 3a and 4a illustrate the parts of a blank 14 prior to any folding operation with FIGS. 3b through 3g and FIGS. 4b through 4g illustrating the manner in which the blank appears at various stages of folding. When unfolded from the condition illustrated in FIGS. 3g and 4g, the carton 42 of FIG. 1a is automatically obtained.

Referring particularly to FIG. 3a, the blank 14 includes four panels 44, 46, 48 and 50 which ultimately become the four panels forming the top of the carton. Panels 52, 54, 56 and 58 ultimately form the four sides of the carton. Panels 60, 62, 64 and 66 combine to form the bottom of the carton.

As explained in the aforementioned application, tabs 68 and 70 are formed in the panels 60 and 64. Alternating panels 62 and 66 are provided respectively with tab receiving slots 72 and 74.

Scorelines are employed to facilitate folding of the panels with respect to each other. In addition, the panels 60 and 64 are provided, respectively, with flaps 76 and 78, these triangular flaps being separated from the main body of the panels by scorelines 80 and 82.

In order to initiate formation of the blank into a folded carton, the bottom panels are first folded relative to adjacent side panels as illustrated in FIGS. 3b and 4b. This folding operation is accomplished by means of the structure of FIG. 1, and the operation of this structure is particularly illustrated in FIGS. 6a through 6c. The folding operation commences when the outer edge of the bottom panels which comprise the leading edge of the blank is brought into position adjacent the flippers 34. These flippers each include a pair of arms 84 extending outwardly from shaft 32. A small diameter roller 86 is secured between the ends of these arms, and the outer edges of the respective bottom panels will each engage a roller 86. By means of an appropriate control, for example a switch engaged by the leading edge of the blank or a photocell detecting the leading edge, the shaft 32 is caused to move in a clockwise direction to move the flippers from the position shown in FIG. 6a to the position shown in FIG. 6b. This causes the end flaps to bend upwardly, and as the blank continues to move, the end panels are forced downwardly into contact with the adjacent side panels. To insure complete folding, each flipper 34 is provided with a roller 88 and the rollers 88 cooperate with rollers 40 to provide complete folding as shown in FIG. 6c. Force is applied by the flippers, preferably by any suitable means applying force to shaft 32 whereby the complete folding can be accomplished.

The ploughs 36 are stationary members, and these ploughs are located in the line of movement of the flaps 76 and 78. Any suitable frame means, independently mounted, may be employed for holding the ploughs in position so that the shaft 32 can move relative to the ploughs. The ploughs could, of course, be mounted without any portion thereof surrounding the shaft for example on independently mounted weldments. As the end panels are bent upwardly by the flippers 34, the flaps are raised above the edge of ploughs 36. The flaps are, therefore, driven against these ploughs which causes the flaps to fold over in the manner illustrated in FIGS. 3c and 4c.

Rollers 87 and 89 (FIGS. 6a–6c) are preferably utilized for feeding blanks 14 to the folding mechanisms. These rollers are preferably provided with a circumference which is of a dimension in excess of the width of the blank 14. For example, if the distance from the outer edge of the bottom panels to the outer edge of the top panels is 26 inches, the rollers 87 and 89 are provided with a circumference of 34 inches. The rollers can then be driven through one revolution for purposes of feeding a blank to the rollers 28 and 30. These latter driven rollers then function to drive the blank toward the folding mechanism, and in the meantime, the next blank 14 is brought up to the rollers 87 and 89 with an 8-inch gap maintained between the blanks. In the high speed equipment, a limitation of 50 to 66 inches for one blank is required and therefore when the blank is 26 inches from leading to trailing edge, a gap of at least 24 inches will result. The gap between the blanks permits the flippers 34 to drop below the plane of the blank movement at the completion of an oscillating cycle. Any suitable hold-down means may be applied to the blank in the area of the rollers to insure that the blank is maintained in the horizontal plane shown and to avoid any jam-up in the equipment.

The folded-over flaps 76 and 78 are to be adhesively secured to the end panels of the blank, in particular the bottom end panels 62 and 66. To accomplish this, means are provided for applying a pressure sensitive adhesive to these bottom panels. This adhesive, or some other type of adhesive may be applied by means of a hot glue technique to the underside of the panels 62 and 66 prior to the folding operation, for example through the use of nozzles 90 shown in FIGS. 6a through 6c. On the other hand, glue applying means 92 as shown in FIG. 1 may be employed for applying the adhesive to the top of the panels 62 and 66 after these panels are folded into the position of FIG. 3c. A glue melting and pumping unit 94 of standard design may be utilized. This unit is also employed for feeding nozzles 96 which may be situated for applying adhesive to the extension 98 formed at the end of side panel 52.

After the adhesive application, the carton is folded by any mechanism into the position shown in FIGS. 3g and 4g and 5d. A conventional unit may be employed for this purpose with the unit preferably modified to include means to hold the bottom panels and flaps down until the ends are folded at least 30°. The adhesive is applied to the panels 62 and 66 in the areas 100 and 102 as shown in FIGS. 3e and 5b. Accordingly, when the end portions of the blank are folded over, the flaps 76 and 78 will be secured to the panels 62 and 66. It will be appreciated that the adhesive could be directly applied to the flaps once they have been folded over, and it is also contemplated that adhesive be applied in both areas depending upon the type of adhesive utilized.

FIG. 7 illustrates a carton blank 110 including top panels 112, 114, 116 and 118. Side panels 120, 122, 124 and 126 are connected to the top panels and end panels 128, 130, 132 and 134 are in turn connected to the side panels. A slotted arrangement is provided at 136 in the bottom panels 128 and 132. Tabs 138 are formed on the bottom panels 130 and 134. [The particular blank illustrated comprises an improved carton design as described along with other designs in application Serial No.]

The construction of this invention is readily adapted for the formation of cartons from blanks of the type illustrated in FIG. 7. The construction of the invention, as noted, is designed so that the flippers and ploughs utilized in the construction can be located in different positions on the supporting shaft (see p. 11) depending upon the particular blank involved. The improved design illustrated in FIG. 7 utilizes a bottom panel 130 defining a flap 140 along with an immediately adjacent bottom panel 132 defining flap 142, the fact that the flippers 86 can be shifted laterally permits the location of flippers opposite panels 130 and 132 in a position such that the panels will be moved upwardly while the flap areas 140 and 142 are free of any contact with the flippers. By relocating the ploughs 136 for contact with the flap during movement of the panels, the blank 110 can be formed with the apparatus in essentially the same manner as previously described. In this connection, it is to be noted that the securing of the flaps to adjacent bottom panels locks the bottom of the construction together irrespective of the presence of tabs and slots. The reenforcing tabs and slots could be dispensed with, and the apparatus of the invention readily utilized for producing cartons of that type.

The arrangement described herein is of particular advantage in that the carton construction referred to can be produced on a highly efficient basis with a minimum requirement for new equipment and, additional labor being involved. Existing carton making equipment is already designed for the handling of blanks with the scoring and cutting tools required for the preparation of the blank described herein being of common design. Similarly, existing carton making operations already involve the application of adhesive materials and accordingly, the practice of the instant invention only requires adjustment of such equipment for purposes of applying the adhesive in the selected areas. Other than the adaptation of this common equipment to the carton of the invention, the manufacturing system requires only the introduction of a folding apparatus of the type described herein. This apparatus represents a unit of relatively small size which can be incorporated without difficulty in existing production lines. The apparatus can be operated at speeds consistent with present industry standards. The operating parts of the apparatus are not of complex design and, therefore, maintenance costs would not be in any way out of line.

As indicated, the mechanism described is suitable for use in connection with a variety of different types of cartons, and the mechanism is preferably designed so that the flippers 34 and ploughs 36 can be adjusted depending upon the particular carton configuration and size being produced. Adjustment can, for example, be accomplished by sliding these members laterally along their supporting shaft (and independent supporting frame in the case of the ploughs) and securing the members in position by means of locking collars and set screws or similar mechanisms.

In spite of the small additional cost of manufacturing equipment, the cartons resulting from the invention are extremely appealing. The cartons can be unfolded for use very rapidly and without any skilled labor being involved. The savings of time and labor costs more than offset the increased manufacturing costs so that applicants' construction actually presents a more economical construction for the trade.

It will be understood that various changes and modifications may be made in the apparatus as described herein which provide the characteristics of the invention without departing from the spirit thereof particularly as defined in the following claims.

We claim:

1. An apparatus for producing a folded carton comprising a bed for supporting a carton blank, said blank including side panels and bottom panels connected to the side panels, means defined by said bottom panels for holding the bottom panels together when the carton is unfolded, said bottom panels being situated in side-by-side relationship in said blank, flaps defined by at least one of said bottom panels, first folding means for folding the bottom panels in over-lying relationship relative to adjacent side panels, *including flippers engaging said bottom panels to move the bottom panels upwardly, said flaps being formed on a pair of bottom panels,* second folding means *aligned with said first folding means in a direction transverse to the movement of said carbon blank* for [engaging] *restraining* said flaps to thereby *reversely* fold said flaps over onto the bottom panels carrying the flaps, *said second folding means including a pair of stationary ploughs positioned in line with said flaps and engaging said flaps during upward movement of the bottom panels, said flaps being driven against the ploughs to fold the flaps over onto the associated panels,* means for applying adhesive to selected surface portions of said bottom panels, third folding means for folding each end of the blank over onto inside portions of the blank, each blank end comprising a side and bottom panel, the adhesive on said blank being positioned for contact with said flaps to secure said ends in the folded position, and means for securing said ends together.

2. An apparatus in accordance with claim 1 including means for releasably positioning said folding means whereby the folding means can be laterally adjusted to accommodate carton blanks of different designs.

3. An apparatus in accordance with claim 1 including means for conveying a blank toward said first folding means, said blank being disposed on said bed with the outer edges of said bottom panels extending in a line perpendicular to the direction of movement of the blank, said outer edges comprising the leading edge of the blank during movement toward said first folding means.

[4. An apparatus in accordance with claim 3 wherein said first folding means comprise flippers engaging said bottom panels to move the bottom panels upwardly, said flaps being formed on a pair of the bottom panels, and including a pair of stationary ploughs positioned in line with said flaps and engaging said flaps during upward movement of the bottom panels, said flaps being driven against the ploughs to fold the flaps over onto the associated panels.]

5. An apparatus in accordance with claim [4] *1* including an oscillating shaft, said flippers being tied to said shaft for movement therewith, said flippers defining engaging ends movable from a position below the plane of movement of a blank to a position above said plane of movement.

6. An apparatus in accordance with claim 5 wherein said ploughs define engaging ends located above the plane of movement of said blank for engagement with said flaps upon upward movement of the bottom panels in response to the operation of said flippers.

[7. An apparatus in accordance with claim 6 including means supporting said ploughs comprising members extending around said shaft, said shaft being movable within said supporting members.]

8. An apparatus in accordance with claim 1 wherein said adhesive is applied to areas on bottom panels adjacent the panels carrying said flaps, said flaps being folded into contact with said areas by said third folding means.

9. An apparatus in accordance with claim 8 including additional flap portions located adjacent said areas, said additional flap portions being free of engagement with other areas of the blank, said additional flap portions serving as means for locking the carton in position when unfolded.

10. An apparatus in accordance with claim 8 wherein said flaps comprise triangular shaped members positioned at the corners of bottom panels, said first mentioned flaps and said additional flaps being located in side-by-side relationship in the unfolded blank.

11. An apparatus in accordance with claim 1 wherein said means for holding the bottom panels together comprise tabs formed in alternating bottom panels and tab receiving slots formed in the other bottom panels, said tabs entering said slots when said carton is unfolded.

12. An apparatus in accordance with claim 1 wherein said means for securing the ends of the carton together comprise an extended portion formed in one side panel and means for applying additional adhesive to the blank, said extended portion being secured to the blank by means of said additional adhesive upon folding of said ends by means of said third folding means.

[13. In an apparatus for producing a folded carton comprising a bed for supporting a carton blank, said blank including side panels and bottom panels connected to the side panels, said bottom panels having portions secured together whereby the bottom panels are held together when the carton is unfolded so that the carton is then automatically set-up and ready for loading, said bottom panels in the blank being situated in side-by-side relationship, and a flap defined by at least one of said bottom panels, the improvements in said apparatus comprising first folding means for folding the bottom panels in overlying relationship relative to adjacent side panels, second folding means for engaging said flap to thereby fold said flap over onto the bottom panel carrying the flap, means for applying adhesive to selected surface portions of said bottom panels, third folding means for folding each end of the blank over onto inside portions of the blank, each blank end comprising a side and bottom panel, the adhesive on said blank being positioned for contact with said flap to secure the flap to an end, and means for securing said ends together.]

[14. An apparatus in accordance with claim 13 including means for releasably positioning said folding means whereby the folding means can be laterally adjusted to accommodate carton blanks of different designs.]

15. In an apparatus for producing a folded carton comprising a bed for supporting a carton blank, said *first and second* blank including side panels and bottom panels connected to the side panels, said bottom panels having portions secured together whereby the bottom panels are held together when the carton is unfolded so that the carton is then automatically set-up and ready for loading, said bottom panels in the blank being situated in side-by-side relationship, and flaps defined by a pair of said bottom panels, the improvement wherein said blank is disposed on said bed with the outer edge of at least one bottom panel extending in a line perpendicular to the direction of movement of the blank, said outer edge comprising the leading edge of the blank, first folding means for folding the bottom panels in overlying relationship relative to adjacent side panels, second folding means for [engaging] *restraining* said flaps to thereby *reversely* fold said flaps into engagement with the bottom panels carrying the flaps, said first folding means comprising flippers engaging said bottom panels to move the bottom panels relative to adjacent side panels, and *said second folding means* including stationary ploughs engaging said flaps during movement of the bottom panels, said flaps being driven against the ploughs to fold the flaps into engagement with the associated panels, *said second folding means aligned with said first folding means in a direction transverse to the movement of said carton blank* means for applying adhesive to selected surface portions of said bottom panels, third folding means for folding each end of the blank into engagement with inside portions of the blank, each blank end comprising a side and bottom panel, the adhesive on said blank being positioned for contact with said flaps to secure said ends in the folded position, and means for securing said ends together.

16. In an apparatus for producing a folded carton comprising a bed for supporting a carton blank, said blank including side panels and bottom panels connected to the side panels, said bottom panels having portions secured together whereby the bottom panels are held together when the carton is unfolded so that the carton is then automatically set-up and ready for loading, said bottom panels in the blank being situated in side-by-side relationship, and flaps defined by a pair of said bottom panels, the improvement wherein said blank is disposed on said bed with the outer edge of at least one bottom panel extending in a line perpendicular to the direction of movement of the blank, said outer edge comprising the leading edge of the blank, first folding means for folding the bottom panels in overlying relationship relative to adjacent side panels, second folding means for engaging said flaps to thereby fold said flaps onto the bottom panels carrying the flaps, said first folding means comprising flippers engaging said bottom panels to move the bottom panels relative to adjacent side panels, and *said second folding means* including stationary ploughs [engaging] *restraining* said flaps during such movement of the bottom panels, said flaps being driven against the ploughs to *reversely* fold the flaps into engagement with the associated panels, said ploughs defining engaging ends displaced from the plane of movement of said blank for engagement with said flaps upon said movement of the bottom panels in response to the operation of said flippers, said ploughs being supported immediately adjacent said flippers whereby said flaps are driven against said ploughs while the flippers are in engagement with the bottom panels, means for applying adhesive to selected surface portions of said bottom panels, third folding means for folding each end of the blank into engagement with inside portions of the blank, each blank end comprising a side and bottom panel, the adhesive being positioned to secure adjacent bottom panels together in pairs by means of said flaps, and means for securing said ends to each other.

17. An apparatus in accordance with claim 16 including an oscillating shaft, said flippers being tied to said shaft for movement therewith, said flippers defining engaging ends movable from a position below the plane of movement of a blank to a position above said plane of movement.

18. An apparatus in accordance with claim 17 including means supporting said ploughs comprising members extending around said shaft, said shaft being movable within said supporting members.

19. An apparatus in accordance with claim 16 wherein said adhesive is applied to areas on bottom panels adjacent the panels carrying said flaps, said flaps being folded into contact with said areas by said third folding means.

20. An apparatus in accordance with claim 19 including additional flap portions located adjacent said areas, said additional flap portions being free of engagement with other areas of the blank, said additional flap portions serving as means for locking the carton in position when unfolded.

21. An apparatus in accordance with claim 19 wherein said flaps comprise triangular shaped members positioned at the corners of bottom panels, said first mentioned flaps and said additional flaps being located in side-by-side relationship in the unfolded blank.

22. An apparatus in accordance with claim 16 wherein said means for holding the bottom panels together comprise tabs formed in alternating bottom panels and tab receiving slots formed in the other bottom panels, said tabs entering said slots when said carton is unfolded.

23. An apparatus in accordance with claim 16 wherein said means for securing the ends of the carton together comprise an extended portion formed in one side panel and means for applying additional adhesive to the blank, said extended portion being secured to the blank by means of said additional adhesive upon folding of said ends by means of said third folding means.

*24. An apparatus for producing a folded carton comprising a bed for supporting a carton blank, said blank including side panels and bottom panels connected to the side panels, means defined by said bottom panels for holding the bottom panels together when the carton is unfolded, said bottom panels being situated in side-by-side relationship in said blank, flaps defined by at least one of said bottom panels, first folding means including flippers for folding the bottom panels in overlying relationship relative to adjacent side panels, said first folding means also including an oscillating shaft to which said flippers are tied, said shaft reciprocating said flippers from a position below the plane of movement of said blank to a position above said plane of movement, second folding means for restraining said flaps to thereby reversely fold said flaps over onto the bottom panels carrying the flaps, said second folding means aligned with said first folding means in a direction transverse to the movement of said carton blank means for applying adhesive to selected surface portions of said bottom panels, third folding means for folding each end of the blank over onto inside portions of the blank, each blank end comprising a side and bottom panel, the adhesive on said blank being positioned for contact with said flaps to secure said ends in the folded position, and means for securing said ends together.*

*25. An apparatus in accordance with claim 24 including means for releasably positioning said first and second folding means whereby the folding means can be laterally adjusted to accommodate carton blanks of different designs.*

*26. An apparatus in accordance with claim 24 including means for conveying a blank toward said first folding means, said blank being disposed on said bed with the outer edges of said bottom panels extending in a line perpendicular to the direction of movement of the blank, said outer edges comprising the leading edge of the blank during movement toward said first folding means.*

*27. An apparatus in accordance with claim 26 wherein said first folding means comprise flippers engaging said bottom panels to move the bottom panels upwardly, said flaps being formed on a pair of bottom panels, and said second folding means including a pair of stationary ploughs positioned in line with said flaps and engaging said flaps during upward movement of the bottom panels, said flaps being driven against the ploughs to fold the flaps over onto the associated panels.*

*28. An apparatus in accordance with claim 27 wherein said ploughs define engaging ends located above the plane of movement of said blank for engagement with said flaps upon upward movement of the bottom panels in response to the operation of said flippers.*

*29. An apparatus in accordance with claim 28 including means supporting said ploughs comprising members extending around said shaft, said shaft being movable within said supporting members.*

*30. An apparatus for producing a folded carton comprising a bed for supporting a carton blank, said blank including side panels and bottom panels connected to the side panels, means defined by said bottom panels for holding the bottom panels together when the carton is unfolded, said bottom panels being situated in side-by-side relationship in said blank, flaps defined by at least one of said bottom panels, first folding means for folding the bottom panels in over-lying relationship relative to adjacent side panels, including flippers engaging said bottom panels to move the bottom panels upwardly, said flaps being formed on a pair of bottom panels, an oscillating shaft, said flippers being tied to said shaft for movement therewith, second folding means for engaging said flaps to thereby fold said flaps over onto the bottom panels carrying the flaps, said second folding means including a pair of stationary ploughs positioned in line with said flaps and engaging said flaps during upward movement of the bottom panels, said flaps being driven against the ploughs to fold the flaps over onto the associated panels, means supporting said ploughs comprising members extending around said shaft, said shaft being movable within said supporting members, means for applying adhesive to selected surface portions of said bottom panels, third folding means for folding each end of the blank over onto inside portions of the blank, each blank end comprising a side and bottom panel, the adhesive on said blank being positioned for contact with said flaps to secure said ends in the folded position, and means for securing said ends together.*

* * * * *